Sept. 5, 1967  A. P. BOWDEN  3,339,566

CHILD'S AWNING DEVICE FOR AUTOMOBILES

Filed Nov. 19, 1965

INVENTOR.
ANGELA P. BOWDEN
BY M. Ralph Shaffer
HER ATTORNEY

United States Patent Office 3,339,566
Patented Sept. 5, 1967

3,339,566
CHILD'S AWNING DEVICE FOR AUTOMOBILES
Angela P. Bowden, Salt Lake City, Utah, assignor of one-half to Blaine Bowden, Salt Lake City, Utah
Filed Nov. 19, 1965, Ser. No. 508,810
1 Claim. (Cl. 135—5)

The present invention relates to automobile utility devices and, more particularly, to a new and improved structure for shielding and protecting the eyes of infants and small children while they are riding in an automobile or other vehicle.

In the past a number of types of infant-accommodating devices have been devised for use in automobiles, trucks, and other vehicles. Such devices will hold the infant in a sitting or standing position and will prevent his injury during sudden stops or lurches of the vehicle. A direct difficulty is presented, however, in the case of protection of the infant's eyes. Conventional sun visors are disposed too high above the head of the infant to be of any practical value. Sun glasses and other optical devices are often unsuitable for infants and, further, do not afford optimum protection.

Accordingly, a principal object of the present invention is to provide a new and improved device, supportable by the upstanding portion of a seat of an automobile, which will protect the vision of infants and small children.

An additional object is to provide an awning- or visor-type device which is readily adjustable and which can be easily installed in a vehicle for the protection of the eyes of children.

An additional object is to provide a device which can be adjusted so that the crossbars of the device may be disposed either rearwardly or forwardly of the front surface of the upstanding back of the seat in question.

An additional object is to provide an awning device which may self-incorporate a harness or safety belt for children.

An additional object is to provide a removable awning device for vehicles which can be adjusted to any degree of accommodation.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

Figure 1:
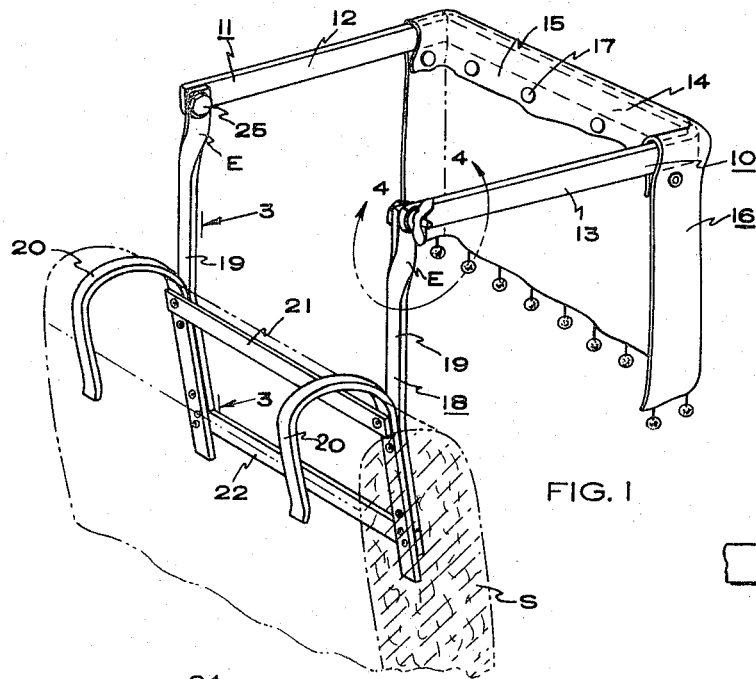
FIGURE 1 is a fragmentary perspective of an awning- or eyeshade-type device incorporating the principles of the present invention.

In FIGURE 1 the awning device 10 is shown to include a U-configured awning support 11 comprising a pair of arms 12 and 13 which are contiguous with the extremities of front portion 14. Front portion 14 slips through the looped margin 15 of awning or visor 16, the margin being formed by snap fasteners 17.

Support structure 18 is composed of uprights 19 each of which is secured to an inverted, J-configured support member 20 as illustrated. Cross members 21 and 22 complete this structure. Rivets, Allen screws, or other means may be used to secure the support structure 18 together.

Figure 2:
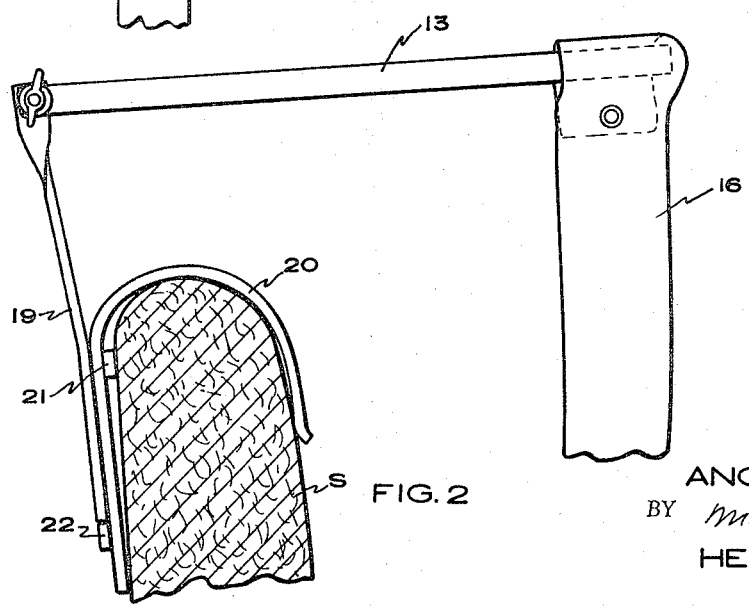
FIGURE 2 is a view of the structure of FIGURE 1 wherein the same has been reversed as to orientation in order to place the crossbars of the device to the rear of the seat in question.

The uppermost extremities E of uprights 19 are provided with respective apertures 23 which accommodate the pivot and retention attachments 24. The latter comprise respective bolts 25, washers 26–28, and wing nuts 29. Thus, it is seen that the U-configured awning support 11 may be positioned not only as indicated in FIGURE 1 but may be disposed upright or in another position, if desired. Furthermore, the structure may be reversed, as shown in FIGURE 2, so that the crossbars are disposed to the rear of seat S of the automobile. In FIGURE 2 the awning structure has been reversed 180° and reversely oriented with respect to the seat top in order that the cross members may be disposed to the rear of the seat. This may be preferred for purposes of comfort or for other reasons.

Figure 3:
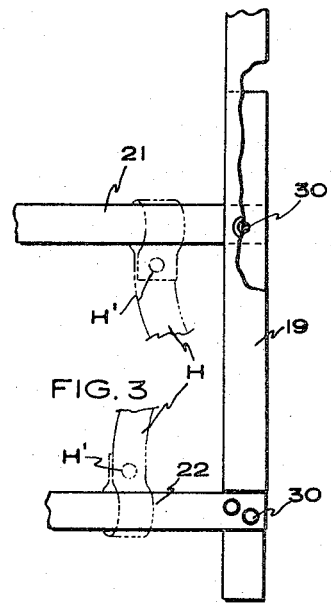
FIGURE 3 is an enlarged, fragmentary elevation taken along the arcuate line 3—3 in FIGURE 1.
Figure 4:
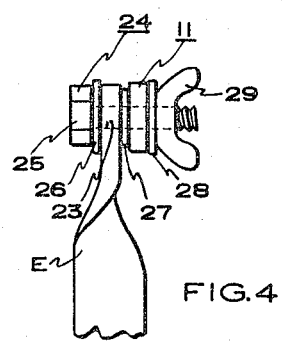
FIGURE 4 is an enlarged detail taken along the line 4—4 in FIGURE 1.

FIGURE 3 illustrates a representative front elevation, partially broken away, of the support structure. The Allen screws, rivets, or other means 30 are indicated by way of representation.

The structure as shown, see particularly FIGURE 1, operates as follows. When it is desired that a young child should ride on the seat S, then the mother or other person will adjust the device 10 of the present invention apppropriately. This may take the form either of that shown in FIGURE 1 or that illustrated in FIGURE 2, for example. In the case of FIGURE 1 the crossbars 21 and 22 are readily available for securing an infant's harness H thereto as by harness snaps H'. This will obviate the normal necessity of looping a strap completely around a seat in order to secure the conventional baby harness or, optionally, avoids the necessity of implacing a conventional car seat in the usual manner.

Where comfort or other convenience requires, the device may be rotated 180° to that condition shown in FIGURE 2 wherein the crossbars are disposed rearwardly of the seat. In such event a separate car seat or strap and harness assembly will be utilized.

The pivotal and retaining structure of FIGURE 3 indicates how the device may be adjusted.

The harness H of FIGURE 3, shown in fragmentary view, merely illustrates in phantom-line configuration a manner in which a conventional infant's harness may be attached to the crossbars of the unit where the same are disposed forwardly of the seat.

Rather than a harness, a car-seat or simply the safety belts of the vehicle may be used to secure the child in riding position.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of the invention.

I claim:

In a child's awning device for vehicles including, in combination, a U-configured awning support member having a bight portion and a pair of parallel legs; means for releasably mounting said awning support member upon the back of a vehicle seat; and an awning mounted to and depending from said awning support member in front of said seat back; said mounting means comprises a pair of mutually-spaced, inverted U-shaped members constructed for engagement positioning over said seat back bracing means connecting said U-shaped members together, elongate means secured to and upstanding from said U-shaped members and pivotally secured to the legs of said awning support for enabling the pivotal displacement of the latter, and means for fixing the positioning of said awning support relative to said elongate means, said awning being releasably snapped over said awning support member and being of substantially the same horizontal dimension than that of said bight portion, whereby said awning is slidably displaceable along said awning support member.

References Cited

UNITED STATES PATENTS

| 2,544,968 | 3/1951 | Newstead | 297—184 |
| 2,733,543 | 2/1956 | Knight | 297—256 |
| 2,752,929 | 7/1956 | Berger | 135—5 |
| 3,258,291 | 6/1966 | Ezquerra | 297—184 |

REINALDO P. MACHADO, *Primary Examiner.*